United States Patent
Furukawa et al.

(10) Patent No.: US 9,383,846 B2
(45) Date of Patent: Jul. 5, 2016

(54) TOUCH SENSOR AND TOUCH SENSOR MANUFACTURING METHOD

(71) Applicant: NISSHA PRINTING CO., LTD., Kyoto-shi, Kyoto (JP)

(72) Inventors: Itsuo Furukawa, Kyoto (JP); Hisaya Takayama, Kyoto (JP); Ikuko Mori, Kyoto (JP)

(73) Assignee: NISSHA PRINTING CO., LTD., Kyoto (JP)

( * ) Notice: Subject to any disclaimer, the term of this patent is extended or adjusted under 35 U.S.C. 154(b) by 0 days.

(21) Appl. No.: 14/903,791

(22) PCT Filed: Apr. 23, 2014

(86) PCT No.: PCT/JP2014/061473
§ 371 (c)(1),
(2) Date: Jan. 8, 2016

(87) PCT Pub. No.: WO2015/004970
PCT Pub. Date: Jan. 15, 2015

(65) Prior Publication Data
US 2016/0162062 A1 Jun. 9, 2016

(30) Foreign Application Priority Data
Jul. 9, 2013 (JP) .................................. 2013-143543

(51) Int. Cl.
*G06F 3/041* (2006.01)
(52) U.S. Cl.
CPC ...... *G06F 3/041* (2013.01); *G06F 2203/04103* (2013.01)
(58) Field of Classification Search
None
See application file for complete search history.

(56) References Cited

U.S. PATENT DOCUMENTS

| 2002/0054261 | A1* | 5/2002 | Sekiguchi | G02F 1/13338 349/122 |
|---|---|---|---|---|
| 2005/0046622 | A1 | 3/2005 | Nakanishi et al. | |
| 2007/0013856 | A1 | 1/2007 | Watanabe et al. | |
| 2008/0005897 | A1* | 1/2008 | Nakanishi | G02F 1/13452 29/829 |
| 2011/0234526 | A1* | 9/2011 | Mi | H05K 3/30 345/174 |

(Continued)

FOREIGN PATENT DOCUMENTS

| JP | 2001-015042 A | 1/2001 |
|---|---|---|
| JP | 2005-115728 A | 4/2005 |

(Continued)

OTHER PUBLICATIONS

International Search Report in PCT/JP2014/061473 dated Jul. 1, 2014.

*Primary Examiner* — Christopher R Lamb
(74) *Attorney, Agent, or Firm* — Global IP Counselors, LLP

(57) ABSTRACT

In a flexible printed circuit (FPC) connection structure for a touch sensor, corrosion of an electrode terminal is prevented without reducing connection reliability. In a touch sensor, a tip of a first passivation layer and a tip of an FPC wiring are spaced apart from one another, and consequently an exposed portion, which is adjacent to a tipmost part and is not covered by the first passivation layer, is formed on a connection terminal. An FPC film includes a tip, which further extends from the FPC wiring and extends to a location at which it overlaps, in a plan view, the first passivation layer, and thereby a space is formed between the tip and the exposed portion. The touch sensor further includes an anti-rust material, which fills the space and thereby covers the exposed portion of the connection terminal.

20 Claims, 9 Drawing Sheets

(56) References Cited

U.S. PATENT DOCUMENTS

2012/0092817 A1 4/2012 Shibahara et al.
2012/0327319 A1* 12/2012 Saitoh .................. G02F 1/1345
349/33

FOREIGN PATENT DOCUMENTS

| JP | 2007-026846 A | 2/2007 |
| JP | 2012-083597 A | 4/2012 |

* cited by examiner

TOUCH SENSOR AND TOUCH SENSOR MANUFACTURING METHOD

CROSS-REFERENCE TO RELATED APPLICATIONS

This U.S. National stage application claims priority under 35 U.S.C. §119(a) to Japanese Patent Application No. 2013-143543, filed in Japan on Jul. 9, 2013, the entire contents of Japanese Patent Application Nos. 2013-143543 are hereby incorporated herein by reference.

BACKGROUND

1. Field of the Invention

The present invention relates to a touch sensor and a touch sensor manufacturing method.

2. Background Art

DESCRIPTION OF THE RELATED ART

In a touch sensor, electrode terminals are provided at tips of routing circuits extending from sensor electrodes. The electrode terminals are connected to a touch-panel-control circuit via a flexible circuit board (flexible printed circuit; hereinbelow called an FPC). The FPC includes an insulative FPC film and FPC wiring, which is formed on the FPC film. In addition, FPC terminals, which are connected to the electrode terminals of the touch panel, are formed on an end part of the FPC wiring.

The FPC terminals are electrically connected to the electrode terminals of the touch panel by anisotropic conductive film (anisotropic conductive film; hereinbelow called ACF).

Although not a touch panel, an FPC-connection structure in a liquid-crystal-display device is disclosed in JP-A-2007-26846.

SUMMARY

In the FPC-connection structure described in JP-A-2007-26846, in order to prevent corrosion of the electrode terminals, a structure is proposed that prevents the penetration of moisture into the anisotropic conductive film. Specifically, in the flexible circuit board, tip parts of the FPC terminals are formed on the inner side of an external shape of an insulating film, and thereby connection portions between FPC terminals and the electrode terminals of the display device can be covered by the insulating film.

The FPC-connection structure described in JP-A-2007-26846 is considered to be effective in that the penetration of moisture into the anisotropic conductive film is inhibited. However, there is a risk that the problems below will arise in adapting such an FPC-connection structure, as is, to an FPC-connection structure for a touch sensor.

First, if the ACF is thermally hardened in the state wherein the insulating film and the FPC terminals overlap, as in JP-A-2007-26846, then the portions at which the insulating film and the FPC terminals overlap will be heated and pressurized; consequently, steps will be created by the thickness of the insulating film, leading to a drop in the reliability of the electrical and mechanical connections between the FPC terminals and the electrode terminals.

Second, although the FPC terminals do not overlap the insulating film, the reliability of the electrical and mechanical connections between the FPC terminals and the electrode terminals declines also in the case wherein the FPC film overlaps. This is because, in this case, it is necessary to completely cover the electrode terminals with the ACF and, furthermore, it is necessary to adequately harden the ACF, and that is problematic.

It is an object of the present invention to, in an FPC-connection structure for a touch sensor, prevent corrosion of an electrode terminal without reducing connection reliability.

Aspects are explained below as the technical solution. These aspects can be arbitrarily combined as needed.

A touch sensor according to one aspect of the present invention includes a touch input sheet, a flexible circuit board, and an electrically conductive adhesive. The touch input sheet includes: a base material; a connection terminal formed on the base material; and an insulating film that covers at least part of a base-end side of the connection terminal, excluding a tip part of the connection terminal. The flexible circuit board includes an FPC film and an FPC wiring, which is formed on the FPC film. The electrically conductive adhesive bonds a tipmost part of the connection terminal and the FPC wiring.

A tip of the insulating film and a tip of the FPC wiring are spaced apart from one another, such that an exposed portion, which is adjacent to the tipmost part and is not covered by the insulating film, is formed on the connection terminal.

The FPC film includes a protruding part, which further extends from the FPC wiring and extends to a location at which it overlaps, in a plan view, the insulating film, such that a space is formed between the protruding part and the exposed portion.

The touch sensor further includes an anti-rust material, which fills the space so as to cover the exposed portion of the connection terminal. Furthermore, "filling" means arranged such that at least part of the space is filled, but it is not required that the entire space be filled.

In this touch sensor, the space between the protruding part and the exposed portion of the connection terminal is formed by the FPC film, and the exposed portion of the connection terminal is covered by the filling of that space with the anti-rust material. Consequently, corrosion of the exposed portion of the connection terminal is inhibited.

Because the tip of the insulating film and the tip of the FPC wiring are spaced apart from one another, the problem of a reduction in the connection reliability tends not to occur when, for example, the electrically conductive adhesive is thermally hardened.

The anti-rust material may fill the space such that the insulating film, which is disposed inside the space, and the FPC film are isolated from one another.

Thereby, the physical distance from the outer part to the exposed portion of the connection terminal is lengthened. Consequently, the exposed portion of the connection terminal tend not to corrode.

The viscosity of the anti-rust material when being filled in the space may be less than 400 MPa·s.

Thus, setting the viscosity of the anti-rust material low makes it easy to fill the interior of the space with the anti-rust material.

The touch input sheet may further include an opposing layer, which is formed on the base material and opposes, across a gap, a tip surface of the protruding part of the FPC film.

In this case, using the opposing layer facilitates the procedure of filling the space with the anti-rust material. Furthermore, the opposing layer is, for example, an adhesive layer or a protective layer.

The opposing layer may include an edge part, which surrounds a portion of the base material wherein the FPC film is connected; and the insulating film may be formed into a strip shape along the edge part of the opposing layer.

If the insulating film is formed into a strip shape along the edge part of the opposing layer, then the amount of the material of the insulating film can be reduced.

A touch sensor manufacturing method according to another aspect of the present invention includes the following steps:

preparing a touch input sheet including: a base material; a connection terminal formed on the base material; and an insulating film that covers at least part of a base-end side of the connection terminal, excluding a tip part;

preparing a flexible circuit board including an FPC film and an FPC wiring, which is formed on the FPC film;

bonding the tipmost part of the connection terminal and the FPC wiring using an electrically conductive adhesive; and filling, wherein; a tip of the insulating film and a tip of the FPC wiring are spaced apart from one another, such that an exposed portion, which is adjacent to the tipmost part and is not covered by the insulating film, is formed on a tip part of the connection terminal; the FPC film includes a protruding part, which further extends from the FPC wiring and extends to a location at which it overlaps, in a plan view, the insulating film, such that a space is formed between the protruding part and the exposed portion, the space with an anti-rust material so as to cover the exposed portion of the connection terminal.

In this method, the space between the protruding part and the exposed portion of the connection terminal is formed by the FPC film, and the exposed portion of the connection terminal is covered by the filling of that space with the anti-rust material. Consequently, corrosion of the exposed portion of the connection terminal is inhibited.

Because the tip of the insulating film and the tip of the FPC wiring are spaced apart from one another, the problem of a reduction in the connection reliability tends not to occur when the electrically conductive adhesive is thermally hardened.

In the touch sensor and the manufacturing method according to the present invention, corrosion of an electrode terminal can be prevented without reducing connection reliability.

DESCRIPTION OF EMBODIMENTS (1) Configuration of Touch Sensor

Figure 1:
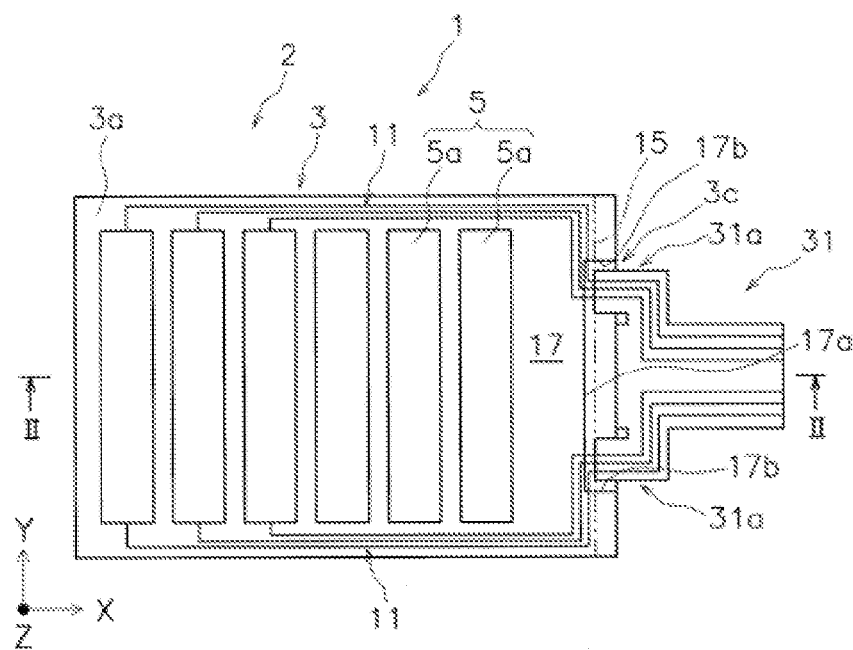
FIG. 1 is a rear view of a touch sensor according to a first embodiment.
Figure 2:
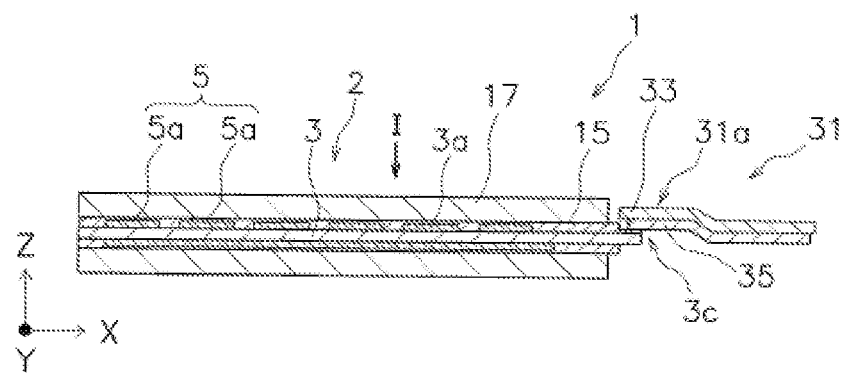
FIG. 2 is a cross-sectional view taken along line II-II in FIG. 1.
Figure 3:
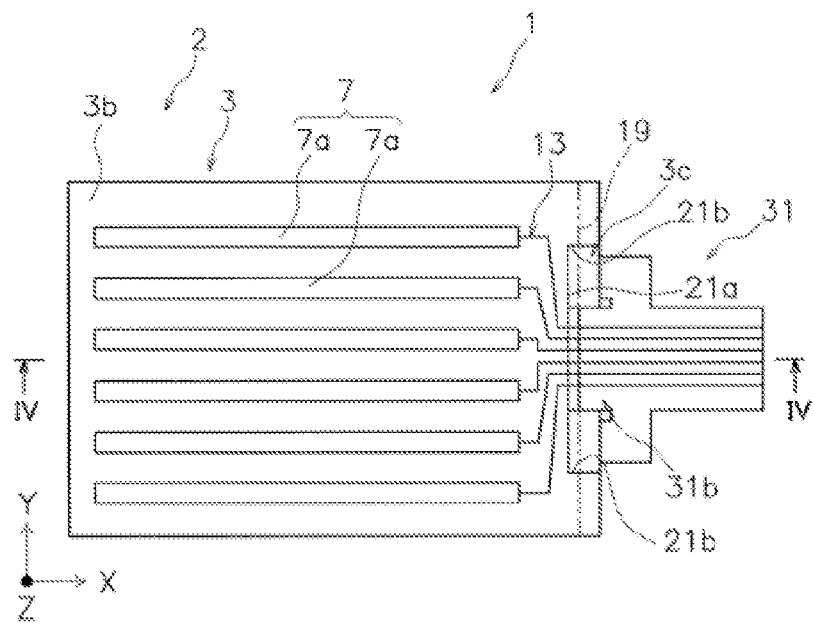
FIG. 3 is a front view of the touch sensor.
Figure 4:
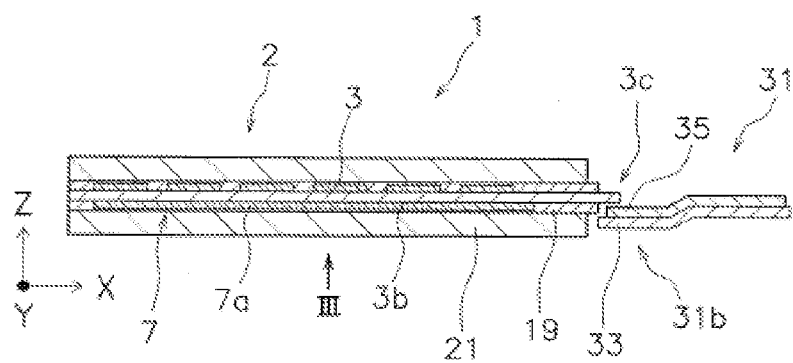
FIG. 4 is a cross-sectional view taken along line IV-IV in FIG. 3.

An embodiment of the present invention is explained below, referencing FIG. 1 to FIG. 4. FIG. 1 is a rear view of the touch sensor, FIG. 2 is a cross-sectional view taken along line II-II in FIG. 1, FIG. 3 is a front view of the touch sensor, and FIG. 4 is a cross-sectional view taken along line IV-IV in FIG. 3.

For the sake of convenience in the explanation of the orientation and positional relationships of the members, the terms X direction, Y direction, and Z direction, which are mutually orthogonal, are used below.

A touch sensor 1 principally includes a touch input sheet 2 and an FPC 31 (discussed later).

The touch input sheet 2 is an electrostatic capacitance touch sensor. The touch input sheet 2 of the present embodiment is a type wherein circuit patterns and fine-line routing-circuit patterns are formed on both surfaces of one base sheet.

The touch input sheet 2 principally includes a base sheet 3, a drive-electrode pattern 5, and a detection-electrode pattern 7.

The base sheet 3 is transparent and is configured in an oblong shape. The base sheet 3 is made of, for example, a resin film or glass. The base sheet 3 has a thickness of, for example, 100 µm.

As shown in FIG. 1 and FIG. 2, the drive-electrode pattern 5 is a circuit pattern formed on a rear surface 3a of the base sheet 3 and formed of a transparent electrically conductive film. In the present embodiment, the drive-electrode pattern 5 includes a plurality of elongated, rectangular first electrode parts 5a extending in the Y direction.

As shown in FIG. 3 and FIG. 4, the detection-electrode pattern 7 is a circuit pattern formed on a front surface 3b of the base sheet 3 and formed of a transparent electrically conductive film. In the present embodiment, the detection-electrode pattern 7 includes a plurality of elongated, rectangular second electrode parts 7a extending in the X direction.

As shown in FIG. 1, a first routing-circuit pattern 11, which extends from the drive-electrode pattern 5, is formed on the rear surface 3a of the base sheet 3. The first routing-circuit pattern 11 extends from an outer-frame part to an FPC-connection part 3c (discussed later) of the base sheet 3. The first routing-circuit pattern 11 is, for example, an opaque, (i.e., light-shielding), electrically conductive film. Specifically, the first routing-circuit pattern 11 is made of copper or a copper alloy and has a thickness of several hundred nanometers.

As shown in FIG. 3, a second routing-circuit pattern 13 that extends from the detection-electrode pattern 7 is formed on the front surface 3b of the base sheet 3. The second routing-circuit pattern 13 extends from an inner part to the FPC-connection part 3c (discussed later) of the base sheet 3. The second routing-circuit pattern 13 is, for example, an opaque (i.e., a light-shielding) electrically conductive film. Specifically, the second routing-circuit pattern 13 is made of copper or a copper alloy and has a thickness of several hundred nanometers.

In the present embodiment, as shown in FIG. 1 and FIG. 2, a first passivation layer 15 is formed over the entire rear surface 3a of the base sheet 3, and a first adhesive 17 is further formed thereupon over the entire surface. As shown in FIG. 3 and FIG. 4, a second passivation layer 19 is formed over the entire front surface 3b of the base sheet 3, and a second adhesive layer 21 is further formed thereupon over the entire surface.

The first passivation layer 15 and the second passivation layer 19 function as insulative anti-rust layers that cover the various electrode patterns. The first passivation layer 15 and the second passivation layer 19 each have a thickness of, for example, 8 µm, and preferably of 5 µm or greater.

The first adhesive 17 and the second adhesive layer 21 are adhesive layers for adhering other members (e.g., a protective panel) to the touch input sheet 2 and possess, for example, an anti-rust function. The first adhesive 17 and the second adhesive layer 21 are generally made of an optically transparent adhesive. The first adhesive 17 and the second adhesive layer 21 each have a thickness of, for example, 25-100 µm.

(2) FPC

The FPC 31 includes a film-base material 33 and a conducting circuit 35, which is formed on the film-base material 33. The conducting circuit 35 is exposed at an end part of the film-base material 33. A flexible insulating film, such as, for example, polyimide (PI), polyethylene terephthalate (PET), or polyethylene naphthalate (PEN), can be used as the film-base material 33. The film-base material 33 has a thickness of, for example, 12.5-25 µm. The conducting circuit 35 is formed using a metal, such as gold, silver, copper, or nickel, or using an electrically conductive paste, such as carbon. In the present embodiment, the conducting circuit 35 includes, for example, copper terminals each having a thickness of 12-35 µm. A printing method, such as screen printing, offset printing, gravure printing, or flexography, or a photoresist method or the like can be used as the method of forming the conducting circuit 35. Furthermore, a cover film that includes an adhesive on its rear surface may be affixed to the FPC 31.

The FPC 31 includes a pair of first connection parts 31a that are connected to the first routing-circuit pattern 11 formed on the rear surface 3a of the base sheet 3. The first connection parts 31a each include: the film-base material 33, which is disposed opposing the rear surface 3a in the Z direction; and the conducting circuit 35, which is on the film-base material 33 and is exposed on the rear surface 3a side. The FPC 31 includes a second connection part 31b, which is connected to the second routing-circuit pattern 13 formed on the front surface 3b of the base sheet 3. The second connection part 31b includes: the film-base material 33, which is disposed opposing the front surface 3b in the Z direction; and the conducting circuit 35, which is on the film-base material 33 and is exposed on the front surface 3b side.

(3) FPC-Connection Structure

The FPC-connection parts 3c are formed on one-side end of the base sheet 3 in the Y direction. The FPC-connection parts 3c are rectangular areas that extend along end surfaces on the rear surface 3a and the front surface 3b of the base sheet 3 and are portions at which the first adhesive 17 and the second adhesive layer 21 are not formed and therefore at which the base sheet 3 is exposed. That is, the FPC-connection parts 3c are enclosed by edge parts of the first adhesive 17 and the second adhesive layer 21; specifically, the FPC-connection part 3c (rear-surface side) of the base sheet 3 is demarcated by a first end surface 17a of the first adhesive 17, which extends in the Y direction, and second end surfaces 17b, which extend from both ends thereof in the X direction. The FPC-connection part 3c (front-surface side) of the base sheet 3 is demarcated by a first end surface 21a of the second adhesive layer 21, which extends in the Y direction, and second end surfaces 21b, which extend from both ends thereof in the X direction.

Figure 5:
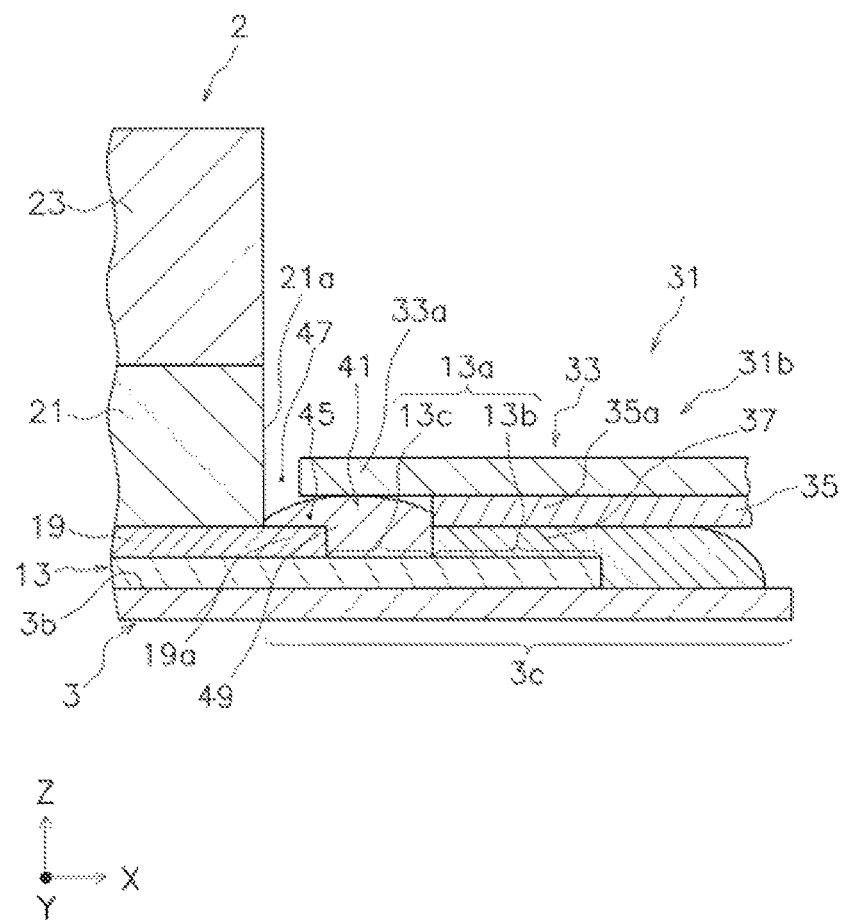
FIG. 5 is a schematic cross-sectional view of an FPC-connection structure.

Next, making use of FIG. 5 through FIG. 8, a structure will be explained wherein the second connection part 31b of the FPC 31 is connected, in the FPC-connection part 3c of the base sheet 3, to the second routing-circuit pattern 13 formed on the front surface 3b. Furthermore, the explanation below also applies to the structure wherein the first connection parts 31a of the FPC 31 are connected, in the FPC-connection part 3c of the base sheet 3, to the first routing-circuit pattern 11 formed on the rear surface 3a. FIG. 5 is a schematic cross-sectional view of the FPC-connection structure, FIG. 6 is a schematic plan view of the FPC-connection structure, FIG. 7 is a schematic plan view of the FPC-connection part of the base sheet, and FIG. 8 is a schematic plan view of the tip of the FPC.

Figure 6:
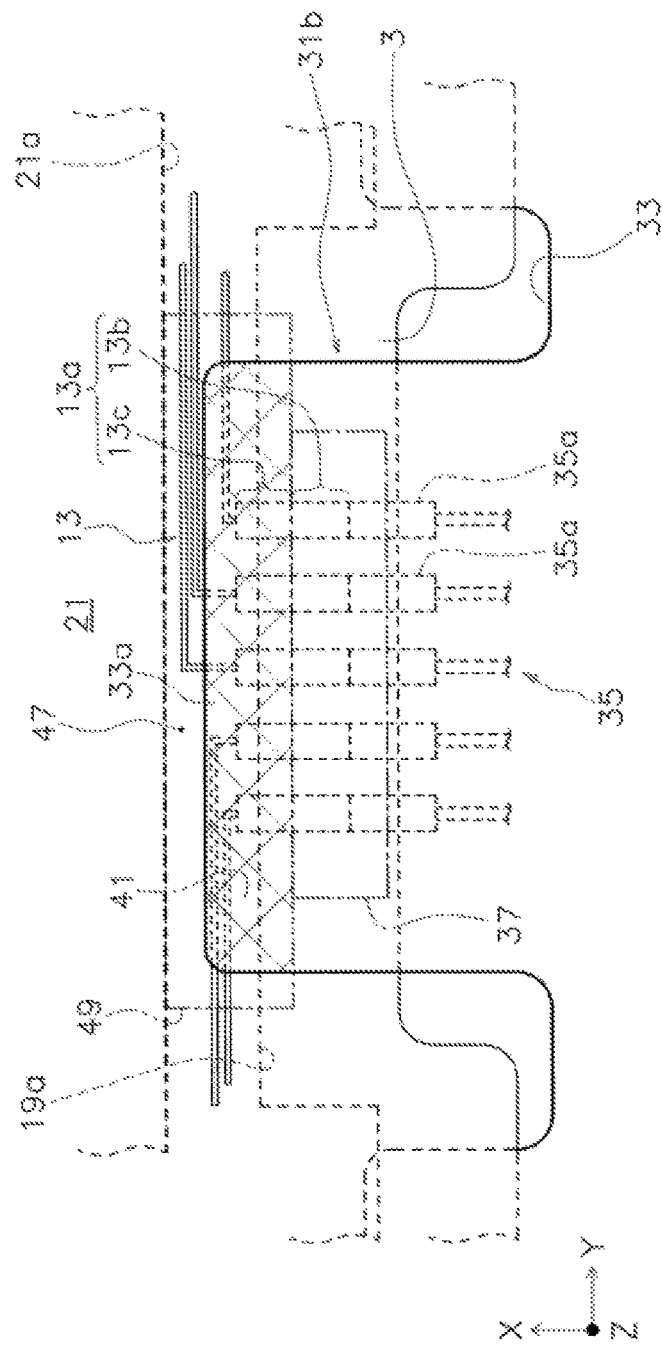
FIG. 6 is a schematic plan view of the FPC-connection structure
Figure 7:
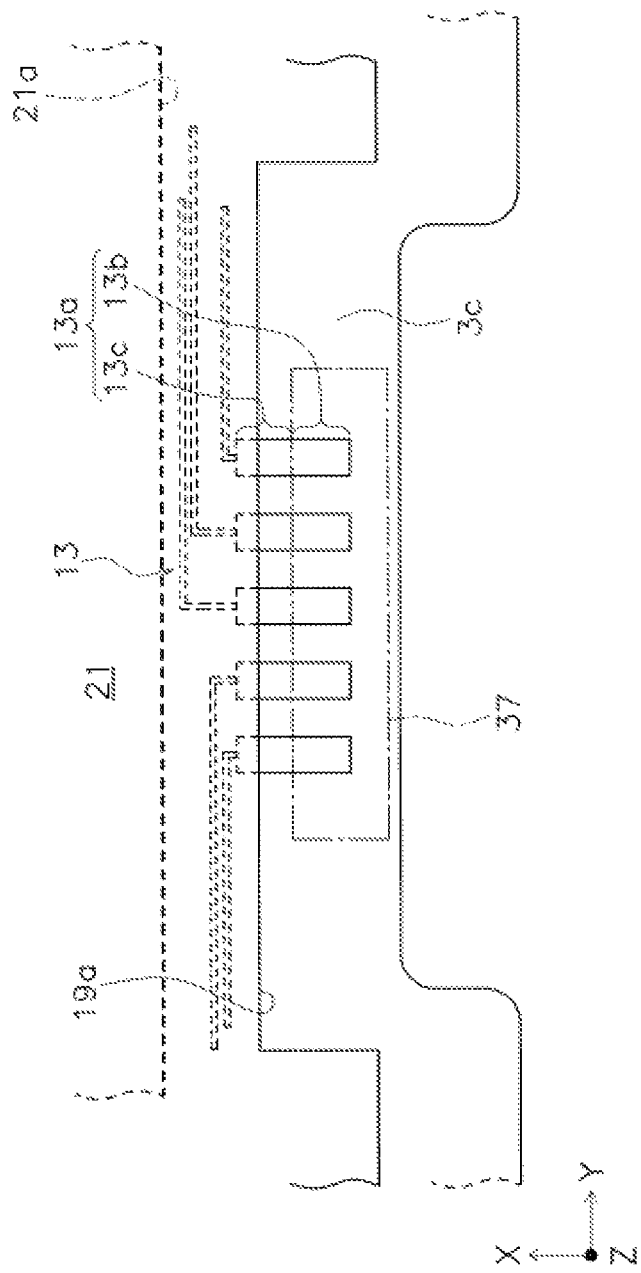
FIG. 7 is a schematic plan view of an FPC-connection part of a base sheet.
Figure 8:
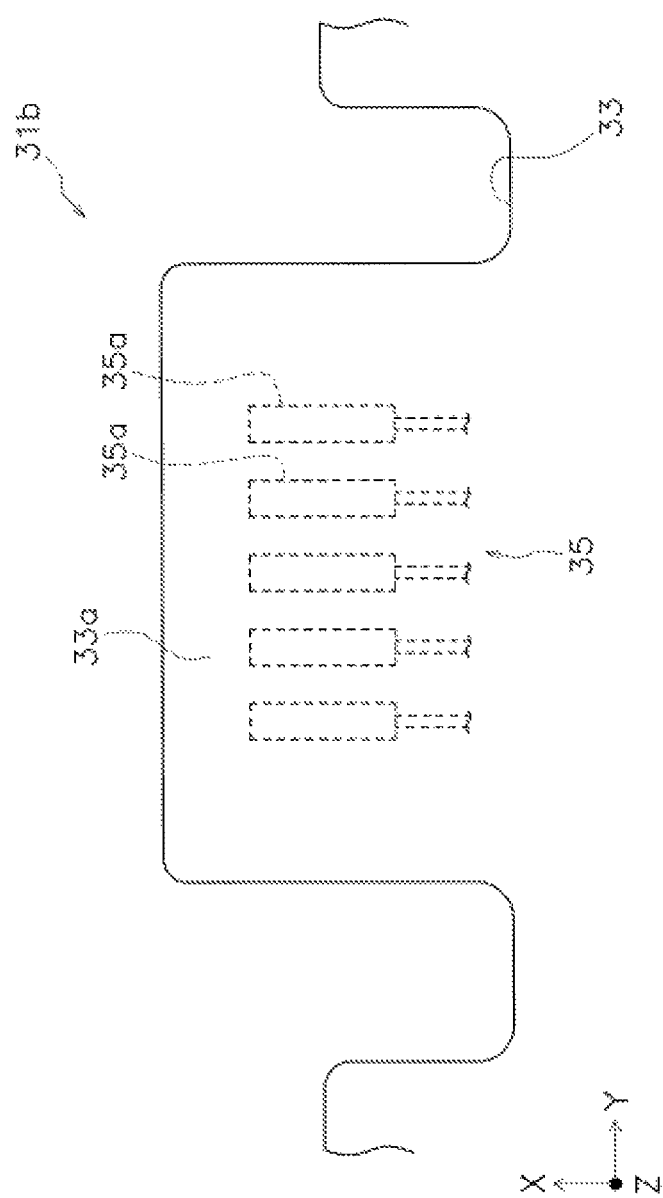
FIG. 8 is a schematic plan view of a tip of the FPC.

As shown in FIG. 5 through FIG. 7, a tip 19a of the second passivation layer 19 is formed beyond the first end surface 21a of the second adhesive layer 21 in the X direction.

As shown in FIG. 5 through FIG. 7, in the FPC-connection part 3c, connection terminals 13a of the second routing-circuit pattern 13 extend in the X direction, and a tip of each of the connection terminals 13a extends even further than the tip 19a of the second passivation layer 19. As shown in FIG. 5 and FIG. 6, tipmost parts 13b, which are tipmost within the connection terminals 13a, overlap connection terminals 35a of the conducting circuit 35 of the FPC 31 in the Z direction, and an ACF 37 is provided therebetween. The thickness of the ACF 37 before heating and pressurizing is, for example, 25 µm. The diameter of the electrically conductive particles is preferably less than 10 µm. Furthermore, a gap between the terminals is preferably several microns. As shown in FIG. 6, the ACF 37 traverses each connection portion between the connection terminals 13a and the connection terminals 35a and extends in the Y direction.

As shown in FIG. 5 and FIG. 6, the tip 19a of the second passivation layer 19 and the connection terminals 35a of the conducting circuit 35 are spaced apart in the direction (X direction) in which the connection terminals 35a extend. Accordingly, the portions of the connection terminals 13a adjacent to the tipmost parts 13b on the base-end side in the X direction are exposed portions 13c, which are not covered by the second passivation layer 19.

In addition, as shown in FIG. 5, FIG. 6, and FIG. 8, a tip 33a of the film-base material 33 extends further in the X direction than the connection terminals 35a of the conducting circuit 35 and extends beyond the exposed portions 13c to a position that overlaps the tip 19a of the second passivation layer 19 in the Z direction. Furthermore, in the present embodiment, as shown in FIG. 5 and FIG. 6, a tip surface of the tip 33a of the film-base material 33 is disposed proximate to the first end surface 21a of the second adhesive layer 21 (creating a second gap 47, which is discussed later).

Furthermore, in FIG. 5, a separator 23 is provided on the second adhesive layer 21. When the procedure for separating the separator 23 is performed, deformation of the second adhesive layer 21 occurs; however, in the present embodiment, the tip 19a of the second passivation layer 19 is formed beyond the first end surface 21a of the second adhesive layer 21 in the X direction, and therefore moisture from an outer part tends not to directly affect the second routing-circuit pattern 13. As a result, the second routing-circuit pattern 13 tends not to corrode.

As described above, as shown in FIG. 5 and FIG. 6, a space 41 is formed by the tip 33a of the film-base material 33, the connection terminals 13a (in particular, the exposed portions 13c), and the tip 19a of the second passivation layer 19. The space 41 communicates with the outer part in the X direction by only a first gap 45 between (in the Z direction) the tip 33a of the film-base material 33 and the tip 19a of the second passivation layer 19. In the present embodiment, the space 41 communicates with the outer part by the second gap 47 between the tip surface of the tip 33a of the film-base material 33 and the first end surface 21a of the second adhesive layer 21. The length of the second gap 47 is, for example, 0.3 mm.

As shown in FIG. 6, the length of the space 41 in the Y direction coincides with the length of the second connection part 31b of the film-base material 33 in the Y direction. In addition, both ends of the space 41 in the Y direction communicate with the outer part.

As shown in FIG. 5 and FIG. 6, the space 41 is filled with an anti-rust material 49. Specifically, the anti-rust material 49 covers the exposed portions 13c of the connection terminals 13a such that the exposed portions 13c do not come into contact with air or moisture. The anti-rust material 49 also isolates the connection terminals 35a of the conducting circuit 35 and the tip 19a of the second passivation layer 19 from the outer part. As shown in FIG. 6, the anti-rust material 49 completely covers the exposed portions 13c of the connection terminals 13a inside the space 41 and, moreover, extends to a position on the front surface 3b of the base sheet 3 further on the outer side in the Y direction than both ends of the second connection part 31b of the film-base material 33 in the Y direction. However, because it is alright if the anti-rust material 49 covers the exposed portions 13c of the connection terminals 13a, the spread shape of the anti-rust material 49 is not particularly critical.

The anti-rust material 49 fills the space 41 such that the second passivation layer 19 disposed inside the space 41, the exposed portions 13c, the ACF 37, and the conducting circuit 35 are isolated from the outer part. Accordingly, not only are the exposed portions 13c of the second routing-circuit patterns 13 isolated from the outer part, but the ACF 37 and the conducting circuit 35 are also isolated from the outer part.

Furthermore, the anti-rust material 49 seals a gap between the second passivation layer 19 and the film-base material 33 (specifically, the tip 33a), thereby isolating the second passivation layer 19 and the film-base material 33 from one another. Thereby, the physical distance from the outer part to the exposed portions 13c of the connection terminals 13a is lengthened. Consequently, the exposed portions 13c of the connection terminals 13a tend not to corrode.

The anti-rust material 49 is made of a material of low viscosity and fills, by being dropped with a dispenser (not shown), the interior of the space 41 via the first gap 45 between the tip 33a of the film-base material 33 and the tip 19a of the second passivation layer 19. The anti-rust material 49 is, for example, fluorine, an acrylic resin, a urethane-based resin, an epoxy-based resin, or a silicone-based resin, and has a viscosity during filling of the space that is preferably in the range of 0-400 MPa·s. More preferably, the viscosity range is 10-200 MPa·s. Thus, setting the viscosity of the anti-rust material 49 low makes it easy to fill the interior of the space 41 with the anti-rust material 49.

In the touch sensor 1, as discussed above, the space 41 is formed, by the tip 33a of the film-base material 33 and between the tip 33a and the exposed portions 13c of the connection terminals 13a, and the exposed portions 13c of the connection terminals 13a are covered by the filling of the space 41 with the anti-rust material 49. Consequently, corrosion of the exposed portions 13c of the connection terminals 13a is inhibited.

In addition, because the tip 19a of the second passivation layer 19 and the connection terminals 35a of the conducting circuit 35 are spaced apart in the X direction, problems, such as a reduction in the connection reliability, tend not to arise if, for example, the ACF 37 is thermally hardened.

Furthermore, providing the space 41 facilitates the filling with the anti-rust material 49.

Furthermore, providing the film-base material 33 with the tip 33a makes it possible to reduce the size of the opening (e.g., the first gap 45) of the space 41. Accordingly, air, moisture, and waste tend not to penetrate the space 41 and, as a result, corrosion of the connection terminals 13a is inhibited.

Furthermore, in the abovementioned embodiment, the first end surface 21a of the second adhesive layer 21 opposes the tip surface of the tip 33a, which is formed on the base sheet 3 and is a protruding part of the film-base material 33, with the second gap 47 interposed therebetween. Accordingly, the use of the second adhesive layer 21 facilitates the procedure of filling the space 41 with the anti-rust material 49. Furthermore, when dropping the anti-rust material 49, another layer (e.g., a protective sheet) may be provided as an opposing layer instead of the adhesive layer, or another layer may not be formed at all.

In the abovementioned embodiment, the ACF 37 does not jut out from the connection terminals 35a of the conducting circuit 35 in the X direction; however, in actuality, the connection terminals 13a may be covered more substantially extending toward the tip side in the X direction than in the abovementioned embodiment. In that case, the anti-rust material 49 covers the connection terminals 13a together with the ACF 37.

(4) Touch Input Sheet Manufacturing Method

A method of manufacturing the touch input sheet 2 will be explained.

First, the transparent electrically conductive film, the light-shielding, electrode-use conductive film, and a first resist layer are sequentially formed over the entirety of both the front and rear surfaces of the transparent base sheet 3, thereby creating an electrically conductive sheet.

Next, desired pattern masks are placed on both surfaces of the electrically conductive sheet, which is then exposed and developed, thereby patterning the first resist layer. At that time, the light-shielding electrode-use conducting film shields the surface on the opposite side from the exposure light rays, and therefore even if different mask patterns are exposed simultaneously, the pattern of the first resist layer on the opposite side is not affected. Accordingly, because it is also possible to simultaneously expose both surfaces, it is easy to align the front and rear first resist layers, thereby making it possible to pattern both surfaces in one process and also to improve productivity.

Next, the fine-line pattern is formed by simultaneously etching the transparent electrically conductive film and the light-shielding electrode-use conducting film with a liquid etchant such as ferric chloride.

Next, after the first resist layer is stripped using a resist-stripping liquid and the light-shielding electrode-use conducting film is exposed, a second resist layer is formed only in a portion of an outer-frame edge part of the exposed light-shielding electrode-use conducting film.

Next, when etched with a special etchant, such as acidified hydrogen peroxide, the outer-frame edge part wherein the second resist layer is formed remains as is; in the center-window part, wherein the second resist layer is not formed and the light-shielding electrode-use conducting film has been exposed, the light-shielding electrode-use conducting film is etched away; and the transparent electrically conductive film therebelow is exposed, thereby becoming the drive-electrode pattern 5 and the detection-electrode pattern 7. In addition, the light-shielding electrode-use conducting film formed in the outer-frame edge part becomes the first routing-circuit pattern 11 and the second routing-circuit pattern 13.

The details of the materials of the members are explained below.

First, the base sheet 3 is made of a transparent sheet having a thickness of approximately 30-2000 μm; in addition to plastic films of polyester-based urethane, polystyrene-based resin, olefinic resin, polybutylene terephthalate-based resin, polycarbonate-based resin, acrylic resin, and the like, various types of glass and the like can be cited as the material of the base sheet 3.

A single metal film with high conductivity and good light-shielding characteristics, layers made of alloys or compounds thereof, and the like can be cited as the light-shielding electrode-use conducting film layer, which may be formed by a vacuum-evaporating method, a sputtering method, an ion-plating method, a plating method, etc. Furthermore, in the transparent electrically conductive film, etching is not performed, and it is also necessary that a self-etching etchant be present. Aluminum, nickel, copper, silver, and the like can be cited as preferable examples of the metal. In particular, a metal film made of copper foil with a thickness of 20-1000 nm (preferably, a thickness of 30 nm or greater) has excellent electrical conductivity and light-shielding characteristics; in contrast, the transparent electrically conductive film is highly preferable because, in addition to being easily etched by aqueous hydrogen peroxide in the presence of an acidic atmosphere that does not etch, it is also easy to connect with an external circuit.

A layer made of a metal oxide, such as indium-tin oxide, zinc oxide, or the like, can be cited as the transparent electrically conductive film, which may be formed by a vacuum-evaporating method, a sputtering method, an ion-plating method, a plating method, etc. The thickness is formed to approximately several tens to several hundreds of nanometers and is easily etched together with the light-shielding electrode-use conducting film by a solution such as ferric chloride and the like; however, it is necessary that it is not easily etched by the liquid etchant of the light-shielding electrode-use conducting film layer, such as aqueous hydrogen peroxide, in an acidic atmosphere.

The first resist layer preferably includes a photoresist material of tetramethylammonium hydroxide or the like that is capable of being exposed by a laser beam, a metal-halide lamp, and the like, and then being developed by an alkaline solution or the like.

The second resist layer is not particularly limited as long as it is a material that is resistant to the liquid etchant of the light-shielding electrode-use conducting film layer, such as aqueous hydrogen peroxide, in the presence of an acidic atmosphere.

As a result of the above, a touch input sheet 2 is obtained that includes: the base sheet 3, connection terminals 11a (not shown), 13a formed thereupon; and the first passivation layer 15 and the second passivation layer 19, each covering at least part of the base-end side, excluding tip parts of the connection terminals 11a (not shown), 13a.

(5) FPC-Connecting Method

A method of connecting the FPC 31 to the touch input sheet 2 will be explained. The method of connecting the first connection parts 31a of the FPC 31 will be explained, but the explanation applies likewise to the second connection part 31b.

First, in the FPC-connection parts 3c of the base sheet 3 of the touch input sheet 2, the first connection parts 31a of the FPC 31 are disposed such that the connection terminals 13a and the connection terminals 35a of the conducting circuit precisely overlap across the ACF 37.

Next, the ACF 37 is hardened by heating and pressurizing. The heating and pressurizing conditions are well known in the art. Thereby, the connection terminals 13a and the connection terminals 35a transition to a conducting state. Furthermore, at this time, because the second passivation layer 19 and the conducting circuit 35 are spaced apart in the X direction and do not overlap, there is a risk that connection reliability will decline owing to a step created by the thickness of the second passivation layer 19.

Last, the anti-rust material 49 is dropped into the space 41 using a dispenser, thereby covering the exposed portions 13c of the connection terminals 13a.

As a result of the above, the touch sensor 1 is completed.

(6) Second Embodiment

Figure 9:
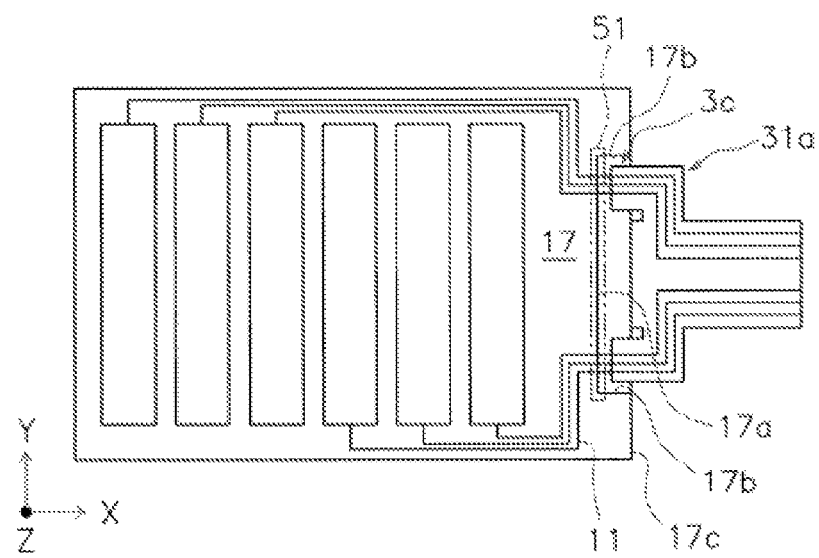
FIG. 9 is a rear view of the touch sensor according to a second embodiment.
Figure 10:
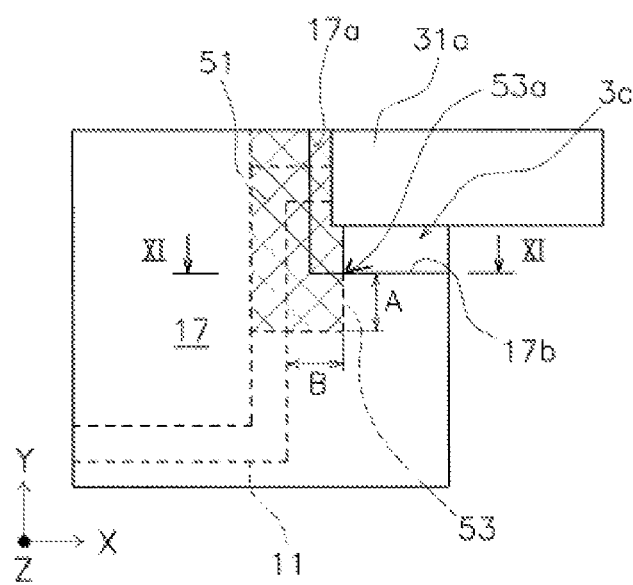
FIG. 10 is a partial plan view of an FPC-connection block diagram.
Figure 11:
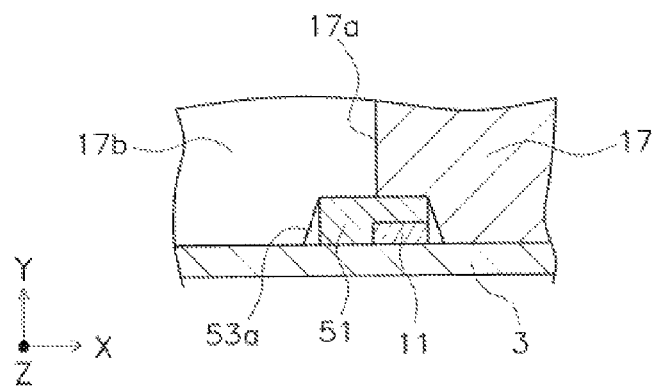
FIG. 11 is a cross-sectional view taken along line XI-XI in FIG. 10.

A second embodiment will be explained, making use of FIG. 9 through FIG. 11. FIG. 9 is a rear view of the touch sensor. FIG. 10 is a partial plan view of the FPC-connection structure. FIG. 11 is a cross-sectional view taken along line XI-XI in FIG. 10.

The basic structure and operational effect of the present embodiment are the same as those of the abovementioned embodiment.

In the present embodiment, unlike in the first embodiment, the passivation layers are formed partially, not entirely, over the surfaces of the base sheet. Specifically, the passivation layers are formed into strip shapes along the end surfaces of the adhesive layers of the FPC-connection parts 3c. The FPC-connection structure of the FPC-connection part 3c (rear-surface side) of the base sheet 3 is explained below, but this explanation can be applied also to the FPC-connection structure of the FPC-connection part 3c (front-surface side) of the base sheet 3.

As explained in the first embodiment, the FPC-connection part 3c (rear-surface side) of the base sheet 3 is demarcated by the first end surface 17a of the first adhesive 17, which extends in the Y direction, and the second end surfaces 17b, which extend in the X direction from both ends of the first end surface 17a.

As shown in FIG. 9, a passivation layer 51 is formed along the first end surface 17a of the first adhesive 17, which extends in the Y direction. Specifically, as shown in FIG. 9 through FIG. 11, the passivation layer 51 extends in the Y direction in the state wherein the passivation layer 51 spans both sides of the first end surface 17a in the X direction.

In so doing, as in the first embodiment, the passivation layer 51 can be used in a structure that has the space 41. In addition, it is possible to reduce the amount of the material of the passivation layer 51 more than in the first embodiment.

Furthermore, when the adhesive layer is formed on the passivation layer, an air gap, which provides communication from the outer part to the routing-circuit pattern, is adversely formed on the one side in the width direction of the passivation layer. As shown in FIG. 10, the air gap in the present embodiment is an air gap 53 of a shape that is bent, in a plan view, along a corner part of the passivation layer 51 (having a portion extending in the Y direction and a portion extending in the X direction). As shown in FIG. 10 and FIG. 11, the air gap 53 has an inlet 53a between the passivation layer 51 and the second end surface 17b. The inlet 53a is open in the Y direction. Accordingly, there is a possibility that moisture that penetrates from the outer part via the inlet 53a will pass through the air gap 53 and reach the first routing-circuit pattern 11. However, by setting the distance (A+B) of the air gap 53 in FIG. 10 sufficiently long, it is possible to make it difficult for moisture to reach the first routing-circuit pattern 11.

(7) Third Embodiment

Figure 12:
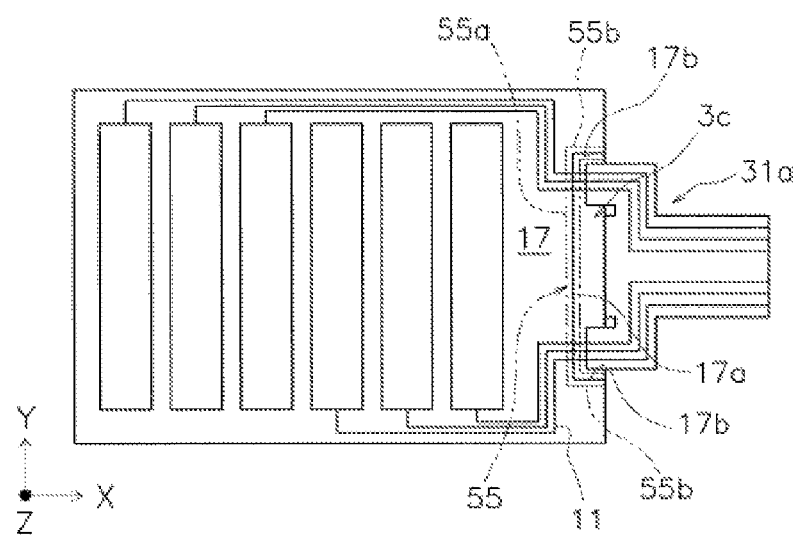
FIG. 12 is a rear view of the touch sensor according to a third embodiment.
Figure 13:
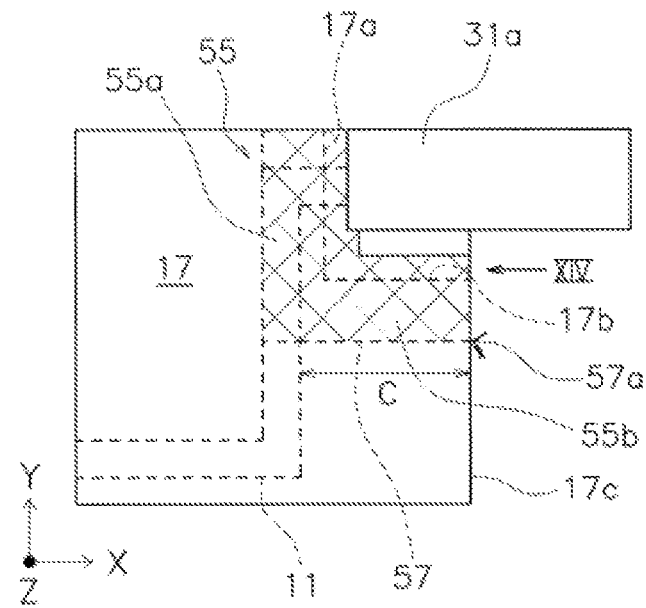
FIG. 13 is a partial plan view of an FPC-connection block diagram.
Figure 14:
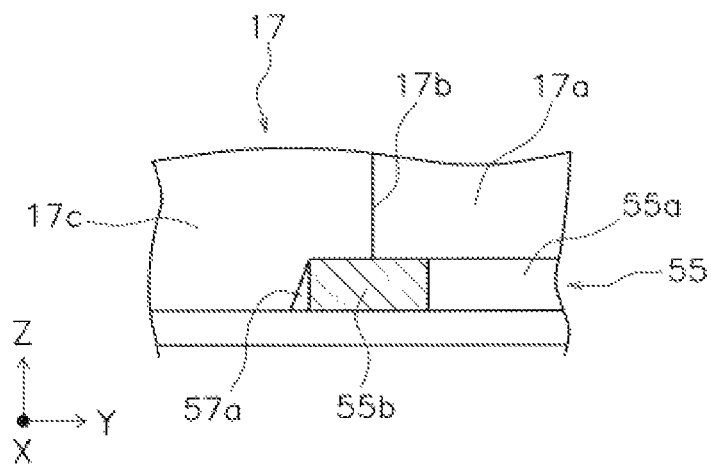
FIG. 14 is an auxiliary side view taken from arrow XIV in FIG. 13.

A third embodiment will be explained, making use of FIG. 12 through FIG. 14. FIG. 12 is a rear view of the touch sensor in the third embodiment. FIG. 13 is a partial plan view of the FPC-connection structure. FIG. 14 is an auxiliary side view taken from arrow XIV in FIG. 13.

The basic structure and the operational effect of the present embodiment are the same as in the abovementioned embodiments.

In the present embodiment, as in the second embodiment, the passivation layers are formed partially, not completely, over the surfaces of the base sheet. Specifically, the passivation layers are formed along the end surfaces of the adhesive layers of the FPC-connection parts 3c.

The following explains the FPC-connection structure of the FPC-connection part 3c (rear-surface side) of the base sheet 3, but this explanation can apply also to the FPC-connection structure of the FPC-connection part 3c (front-surface side) of the base sheet 3.

As was explained in the first embodiment, the FPC-connection part 3c (rear-surface side) of the base sheet 3 is demarcated by the first end surface 17a, which extends in the Y direction of the first adhesive 17, and the second end surfaces 17b, which extend in the X direction from both ends of the first end surface 17a.

As shown in FIG. 12, a passivation layer 55 is formed along the first end surface 17a and the second end surfaces 17b of the first adhesive 17. Specifically, as shown in FIG. 12 to FIG. 14, the passivation layer 55 extends in the Y direction in the state wherein a first portion 55a spans the first end surface 17a on both sides in the X direction, and further continuously extends in the X direction in the state wherein a pair of second portions 55b span the second end surfaces 17b on both sides in the Y direction.

In so doing, as in the first embodiment, the passivation layer 51 can be used in the structure having the space 41. In addition, it is possible to reduce the amount of material of the passivation layer 51 more than in the first embodiment.

Furthermore, when forming the adhesive layer on the passivation layer, an air gap, which provides communication from the outer part to the routing-circuit pattern, is adversely formed on the one side in the width direction of the passivation layer. The air gap in the present embodiment has a shape that, in a plan view, extends linearly in the X direction along the second portions 55b of the passivation layer 55. An air gap 57 has an inlet 57a between the passivation layer 55 and a third end surface 17c, which faces the first adhesive 17 in the X direction. The inlet 57a is open in the X direction. Accordingly, there is a possibility that moisture that penetrates from the outer part via the inlet 57a will pass through the air gap 57 and reach the first routing-circuit pattern 11. However, by setting a distance (C) of the air gap 57 in FIG. 13 sufficiently long, it is possible to make it difficult for the moisture to reach the first routing-circuit pattern 11. In particular, in the present embodiment, the distance (C) is set longer than the distance (A+B) compared with the second embodiment, and therefore the abovementioned effect is further enhanced.

The reason for this is that, in the second embodiment, the passivation layer 51 is not formed on the second end surface 17b of the first adhesive 17, and therefore the inlet 53a of the air gap 53 between the first adhesive 17 and the passivation layer 51 is adversely located on the inner side of the end surfaces of the base sheet 3; as a result, if moisture penetrates from the outer part to the boundary, then the distance that the moisture travels to reach the first routing-circuit pattern 11 is adversely shortened.

In contrast, in the third embodiment, the passivation layer 55 is formed on the second end surface 17b of the first adhesive 17, and therefore the inlet 57a of the air gap 57 between the first adhesive 17 and the passivation layer 55 is formed in the third end surface 17c of the base sheet 3. Consequently, if moisture penetrates from the outer part to the air gap 57, then the distance that the moisture travels to reach the first routing-circuit pattern 11 is lengthened.

(8) Fourth Embodiment

The first through third embodiments explained embodiments of the touch sensor wherein the circuit patterns and the fine-line routing-circuit patterns are formed on the front surface and the rear surface of one transparent base sheet, but the present invention is not limited thereto.

For example, the circuit patterns and the routing-circuit patterns of the transparent electrically conductive films can be formed on a frontmost surface and a rearmost surface of a plurality of stacked transparent base sheets. To obtain such a touch sensor, first, two thin base sheets are used; a transparent electrically conductive film, a light-shielding electrode-use conducting film, and a first resist layer are successively formed over the entire surface of one surface of each of the two base sheets; after which these two base sheets are stacked such that they are opposing, and used as the electrically conductive sheet. Furthermore, a dry laminate, wherein a thermo-laminate, an adhesive layer, or the like is interposed, or the like can be recited as a base sheet laminating means. If the base sheets are stacked by an adhesive layer, then it is also possible to adjust the thickness of the entire laminated body by using an adhesive layer having a core.

(9) Modified Examples

The types and shapes of the touch input sheet are not limited to the abovementioned embodiments. In particular, the pattern and arrangement of the sensor electrodes of the touch input sheet are not limited to the abovementioned embodiments. For example, the shapes, the positional relationships, and the formed layers of the drive-electrode patterns and the detection-electrode patterns may differ from the abovementioned embodiments.

The structure of the FPC, in particular, the shape of the connection terminals of the conducting circuits, is not limited to the abovementioned embodiments.

The specific configuration of the FPC-connection structure is not limited to the abovementioned embodiments.

(10) Features Common to the Embodiments

The first through fourth embodiments have the following configurations and functions in common.

A touch sensor (e.g., the touch sensor 1) includes: a touch input sheet (e.g., the touch input sheet 2), a flexible circuit board (e.g., the FPC 31), and an electrically conductive adhesive (e.g., the ACF 37). The touch sensor input sheet includes: a base material (e.g., the base sheet 3); a connection terminal (e.g., the connection terminals 11a (not shown), 13a), which is formed on the base material; and an insulating film (e.g., the first passivation layer 15, the second passivation layer 19, the passivation layer 51, and the passivation layer 55), which covers at least part of the base-end side of the connection terminal, excluding the tip part. The flexible circuit board includes: an FPC film (e.g., the film-base material 33); and an FPC wiring (e.g., the conducting circuit 35), which is formed on the FPC film. The electrically conductive adhesive bonds a tipmost part (e.g., the tipmost part 13b) of the connection terminal and the FPC wiring.

The tip of the insulating film and the tip of the FPC wiring are spaced apart from one another, and consequently an exposed portion (e.g., the exposed portion 13c), which is adjacent to the tipmost part and is not covered by the insulating film, is formed on the connection terminal.

The FPC film has a protruding part (e.g., the tip 33a) that further extends from the FPC wiring and extends to a location at which it overlaps, in a plan view, the insulating film, and thereby a space (e.g., the space 41) is formed between the protruding part and the exposed portion.

The touch sensor further includes: an anti-rust material (e.g., the anti-rust material 49), which fills the space and covers the exposed portion of the connection terminal. Furthermore, "filled" means arranged such that at least part of the space is filled, but it is not required that the entire space be filled.

In this touch sensor, the space between the protruding part and the exposed portion of the connection terminal is formed by the protruding part of the FPC film, and the exposed portion of the connection terminal is covered by the filling of that space with the anti-rust material. Consequently, corrosion of the exposed portion of the connection terminal is inhibited.

Because the tip of the insulating film and the tip of the FPC wiring are spaced apart from one another, the problem of a reduction in the connection reliability tends not to occur when, for example, the electrically conductive adhesive is thermally hardened.

(11) Other Embodiments

The above explained one embodiment of the present invention, but the present invention is not limited to the abovementioned embodiments, and it is understood that various modifications may be effected within a range that does not depart from the spirit of the invention. In particular, the embodiments and modified examples written in the present specification can be arbitrarily combined as needed.

The present invention can be broadly applied to touch sensors and touch sensor manufacturing methods.

The invention claimed is:

1. A touch sensor, comprising:
a touch input sheet including: a base material; a connection terminal formed on the base material; and an insulating film that covers at least part of a base-end side of the connection terminal, excluding a tip part of the connection terminal;
a flexible circuit board including an FPC film and an FPC wiring formed on the FPC film; and
an electrically conductive adhesive bonding a tipmost part of the connection terminal and the FPC wiring; such that a tip of the insulating film and a tip of the FPC wiring are spaced apart from one another, such that an exposed portion adjacent to the tipmost part and not covered by the insulating film is formed on the connection terminal;
the FPC film includes a protruding part further extending from the FPC wiring and extending to a location at which it overlaps, in a plan view, the insulating film, such that a space is formed between the protruding part and the exposed portion; and
the touch sensor further includes an anti-rust material filling the space so as to cover the exposed portion of the connection terminal.

2. The touch sensor according to claim 1, wherein
the anti-rust material fills the space such that the insulating film disposed inside the space and the FPC film are isolated from one another.

3. The touch sensor according to claim 1, wherein
the viscosity of the anti-rust material when being filled in the space is less than 400 MPa·s.

4. The touch sensor according to claim 1, wherein
the touch input sheet further includes an opposing layer formed on the base material and opposing, across a gap, a tip surface of the protruding part of the FPC film.

5. The touch sensor according to claim 4, wherein
the opposing layer includes an edge part surrounding a portion of the base material wherein the FPC film is connected; and
the insulating film is formed into a strip shape along the edge part of the opposing layer.

6. The touch sensor according to claim 2, wherein
the viscosity of the anti-rust material when being filled in the space is less than 400 MP·s.

7. The touch sensor according to claim 6, wherein
the touch input sheet further includes an opposing layer formed on the base material and opposing, across a gap, a tip surface of the protruding part of the FPC film.

8. The touch sensor according to claim 7, wherein
the opposing layer includes an edge part surrounding a portion of the base material wherein the FPC film is connected; and
the insulating film is formed into a strip shape along the edge part of the opposing layer.

9. The touch sensor according to claim 3, wherein
the touch input sheet further includes an opposing layer formed on the base material and opposing, across a gap, a tip surface of the protruding part of the FPC film.

10. The touch sensor according to claim 9, wherein
the opposing layer includes an edge part surrounding a portion of the base material wherein the FPC film is connected; and
the insulating film is formed into a strip shape along the edge part of the opposing layer.

11. A touch sensor manufacturing method, comprising:
preparing a touch input sheet including: a base material; a connection terminal formed on the base material; and an insulating film that covers at least part of a base-end side of the connection terminal, excluding a tip part of the connection terminal;
preparing a flexible circuit board including an FPC film and an FPC wiring formed on the FPC film; and
bonding the tipmost part of the connection terminal and the FPC wiring using an electrically conductive adhesive; and
filling, such that a tip of the insulating film and a tip of the FPC wiring are spaced apart from one another, such that an exposed portion, which is adjacent to the tipmost part and is not covered by the insulating film, is formed on the connection terminal; the FPC film includes a protruding part further extending from the FPC wiring and extending to a location at which it overlaps, in a plan view, the insulating film, such that a space is formed between the protruding part and the exposed portion, the space with an anti-rust material so as to cover the exposed portion of the connection terminal.

12. The touch sensor manufacturing method according to claim 11, wherein
in the filling with the anti-rust material, the anti-rust material fills the space such that the insulating film disposed inside the space and the FPC film are isolated from one another.

13. The touch sensor manufacturing method according to claim 11, wherein
the viscosity of the anti-rust material when being filled in the space is less than 400 MP·s.

14. The touch sensor manufacturing method according to claim 11, wherein
before filling the space with the anti-rust material, an opposing layer, which opposes, across a gap, a tip surface of the protruding part of the FPC film, is formed on the base material.

15. The touch sensor manufacturing method according to claim 14, wherein
the opposing layer includes an edge part surrounding a portion of the base material wherein the FPC film is disposed; and
the insulating film is formed into a strip shape along the edge part of the opposing layer.

16. The touch sensor manufacturing method according to claim 12, wherein
the viscosity of the anti-rust material when being filled in the space is less than 400 MPa·s.

17. The touch sensor manufacturing method according to claim 16, wherein
before filling the space with the anti-rust material, an opposing layer, which opposes, across a gap, a tip surface of the protruding part of the FPC film, is formed on the base material.

18. The touch sensor manufacturing method according to claim 17, wherein
the opposing layer includes an edge part surrounding a portion of the base material wherein the FPC film is disposed; and
the insulating film is formed into a strip shape along the edge part of the opposing layer.

19. The touch sensor manufacturing method according to claim 13, wherein
before filling the space with the anti-rust material, an opposing layer, which opposes, across a gap, a tip surface of the protruding part of the FPC film, is formed on the base material.

20. The touch sensor manufacturing method according to claim 19, wherein
the opposing layer includes an edge part surrounding a portion of the base material wherein the FPC film is disposed; and
the insulating film is formed into a strip shape along the edge part of the opposing layer.

\* \* \* \* \*